(12) United States Patent
Aljadeff et al.

(10) Patent No.: US 6,968,194 B2
(45) Date of Patent: Nov. 22, 2005

(54) METHOD AND SYSTEM FOR SYNCHRONIZING LOCATION FINDING MEASUREMENTS IN A WIRELESS LOCAL AREA NETWORK

(75) Inventors: Daniel Aljadeff, Kiriat Ono (IL); Yair Granot, Modiin (IL)

(73) Assignee: AeroScout, Ltd., Rehovot (IL)

( * ) Notice: Subject to any disclaimer, the term of this patent is extended or adjusted under 35 U.S.C. 154(b) by 239 days.

(21) Appl. No.: 10/677,440

(22) Filed: Oct. 2, 2003

(65) Prior Publication Data

US 2004/0072582 A1    Apr. 15, 2004

Related U.S. Application Data

(63) Continuation-in-part of application No. 10/225,267, filed on Aug. 20, 2002.

(51) Int. Cl.[7] .............................................. H04Q 7/20
(52) U.S. Cl. ............................... 455/456.1; 455/404.2; 342/450
(58) Field of Search .......................... 455/456.1, 404.2, 455/414.2, 457; 342/450, 442, 457

(56) References Cited

U.S. PATENT DOCUMENTS

| | | | | |
|---|---|---|---|---|
| 4,698,781 A | * | 10/1987 | Cockerell, Jr. .............. | 342/463 |
| 5,483,455 A | * | 1/1996 | Lay et al. .................... | 701/206 |
| 5,732,354 A | * | 3/1998 | MacDonald ............. | 455/456.2 |
| 6,356,608 B1 | * | 3/2002 | Atarius ....................... | 375/362 |
| 6,429,809 B1 | * | 8/2002 | Vayanos et al. ....... | 342/357.03 |

* cited by examiner

Primary Examiner—Charles Appiah
Assistant Examiner—Nghi H. Ly
(74) Attorney, Agent, or Firm—A. Mitchell Harris; Weiss, Moy & Harris, P.C.

(57) ABSTRACT

A method and system for synchronizing location finding measurements in a wireless local area network (WLAN) provides a low cost mechanism for correcting location measurements within a WLAN location finding system. Multiple location receivers compute the time-of-arrival (TOA) of a reference transmitter signal, which is generally a beacon signal. The TOAs are collected and reported to a master unit that contains stored predetermined position information for the location receivers. The master unit computes the time-differences-of-arrival (TDOA) between multiple receivers and computes differences between the measured TDOAs and theoretical TDOAs computed in conformity with the predetermined position of each location receiver. The deviations between theoretical and measured TDOAs are collected in a statistical sample set and Kalman filters are used to produce a model of location receiver timebase offset and drift over multiple received beacon signals. The filter outputs are used to then either correct subsequent TDOA measurements for each location receiver, improving the accuracy of subsequent and/or prior TDOA measurements, or commands are sent to the location receivers to calibrate the timebases within the location receivers in order to improve the accuracy of subsequent TOA measurements.

41 Claims, 6 Drawing Sheets

METHOD AND SYSTEM FOR SYNCHRONIZING LOCATION FINDING MEASUREMENTS IN A WIRELESS LOCAL AREA NETWORK

CROSS-REFERENCE TO RELATED APPLICATIONS

The present application is a continuation in part of co-pending U.S. patent application "METHOD AND SYSTEM FOR LOCATION FINDING IN A WIRELESS LOCAL AREA NETWORK", Ser. No. 10/225,267 filed on Aug. 20, 2002, the specification of which is herein incorporated by reference.

BACKGROUND OF THE INVENTION

1. Field of the Invention

The present invention relates generally to wireless networks, and more specifically, to a method and system for synchronizing a location finding system within a wireless network.

2. Background of the Invention

A multitude of wireless communications systems are in common use today. Mobile telephones, pagers and wireless-connected computing devices such as personal digital assistants (PDAs) and laptop computers provide portable communications at virtually any locality. Wireless local area networks (WLANs) and wireless personal area networks (WPANs) according to the Institute of Electrical and Electronic Engineers (IEEE) specifications 802.11 (WLAN) (including 802.11a, 802.11b, etc.), 802.15.1 (WPAN) and 802.15.4 (WPAN-LR) also provide wireless interconnection of computing devices and personal communications devices, as well as other devices such as home automation devices.

Within the above-listed networks and wireless networks in general, it is desirable to know the location of devices for operation of location-based services, mapping of network facilities, and security. The above-incorporated parent application describes a method and system for location finding within a wireless network and various applications for the location finding results. The method and system use the time-difference-of-arrival (TDOA) of a transmitted signal received at multiple receivers within a wireless network in order to determine the position of the transmitting device via triangulation.

In the TDOA location finding system described above, synchronization of devices is essential so that accurate TDOA measurements are made between the network devices. Synchronization in the above-referenced parent application is achieved through synchronizing a timebase in each of the location-finding units.

Hard-wired synchronization schemes may distribute a clock from a central source, but distribution of a clock is a costly alternative to synchronization. Hard-wired schemes that pass synchronization error information over a wired network connection as well as wireless synchronization schemes are preferable, but rely on stability and accuracy of the local clock in each location receiver.

Synchronization of local-clock timebases via a synchronization message consumes valuable network bandwidth and the accuracy of the message-based synchronization scheme described above is dependent on the frequency of synchronization messages. There is an upper limit on the accuracy of the above-described synchronization scheme determined by how frequently synchronization messages can be transmitted and received. Therefore, it would be desirable to provide a method and system for accurately measuring location within a TDOA-based location finding system that introduces little or no synchronization overhead or distribution of a wired high-frequency clock or accurate edge reference signal to the location receivers.

SUMMARY OF THE INVENTION

The above objective of providing a method and system for accurate TDOA-based location finding with little or no synchronization overhead in a wireless network is achieved in a method and system for synchronizing TDOA-based location finding measurements in a wireless local area network.

The method is embodied in a system that gathers time-difference-of-arrival (TDOA) information, for signals transmitted from one or more known transmission locations, from multiple location receivers located at known positions. The differences between the gathered TDOA information and theoretical TDOA values based on known positions of the location receivers and the transmission locations are computed. Synchronization error (e.g., offset and drift between the devices' local timebases) is determined from the differences between the theoretical and gathered TDOA information and then subsequent and/or prior TDOA measurements for locating wireless devices at unknown positions are corrected in conformity with computed synchronization error, compensating for offset and drift in the location receivers' local clocks and also compensating for differences in initial timebase counts of the location receivers.

The TDOA measurement corrections may be made at a particular wireless device such as a master wireless network unit, which may be an access point, or at a separate wired or wireless-connected server that computes the location of other wireless devices in subsequent TDOA location finding measurements. The TOA information from the location receivers is corrected in conformity with offset and frequency drift estimators calculated from the computed differences between the gathered and theoretical TDOA information, and the system can perform backward computation to correct signals already received. Kalman filters may be employed that predict error in the location receiver timebases in conformity with statistics of a TOA difference sample set.

Alternatively, the computed differences may be used to correct the local clocks of the location receivers by sending correction information to the location receivers for compensating the local timebases and/or adjusting the frequency of the local clocks.

The foregoing and other objectives, features, and advantages of the invention will be apparent from the following, more particular, description of the preferred embodiment of the invention, as illustrated in the accompanying drawings.

DETAILED DESCRIPTION OF THE ILLUSTRATIVE EMBODIMENT

The above-incorporated U.S. patent application "METHOD AND SYSTEM FOR LOCATION FINDING IN A WIRELESS LOCAL AREA NETWORK" details a method and system for providing location finding within a wireless network, such as a WLAN (e.g., IEEE 802.11) or WPAN network, by determining a time-difference-of-arrival (TDOA) profile for signals received from wireless devices connected to or attempting to connect to the wireless network.

The system and method described in the above-incorporated patent application describes location finding using dedicated location receivers having incorporated location finding electronics that can detect an accurate time-of-arrival (TOA) of standard signals within the network, such as beacon signals (broadcast) or handshaking signals. By observing time-of-arrival (TOA) of the signals at multiple units, determining time-difference-of-arrival (TDOA) for the signals, and then triangulating the resulting TDOAs at a location server device the location of a transmitting device can be found.

In TDOA location-finding techniques, the location of a transmitting source is determined by triangulation based on the timing between the signal arrivals at the multiple location receivers. Precise synchronization of the multiple location receivers is essential in order to produce accurate results, as differences between clock frequencies and timebase counts of the multiple location receivers cause error in the determined location of a transmitting unit.

The present invention provides compensation for location finding error without requiring hard-wired or other physical synchronization of the location receivers. Computation of synchronization error and subsequent correction of TDOA measurements ("virtual" synchronization) may be performed via calculation in software. Alternatively, the computed synchronization error may be used to provide physical synchronization by correcting local clocks and/or setting location receiver local timebase counts, thus providing physical synchronization as opposed to "virtual" synchronization.

Adjustment of the location receivers is not required as long as the device performing the location computations has sufficient information to compensate for frequency drift and offset among the various location receivers, as well as compensate for differences in the initial time readings of the participating wireless devices. Therefore, synchronization within the context of the present invention should be understood to include both a priori and a posteriori adjustment of the gathered TDOA data (virtual synchronization), as well as a priori adjustment of the timebase used to gather the TDOA data as an alternative physical synchronization scheme.

One manner of accomplishing the above-mentioned compensation is to gather TOA data for pairs of fixed position location receivers receiving a periodically-transmitted signal and statistically track changes in the TDOA for the received signals over time. For fixed position location receivers, the changes in TDOA measurements indicate changes due to frequency drift and offset in the local (internal) clocks and constant differences indicate the accumulated timebase count error at the location receivers at the time of an initial measurement. In order to track the absolute error and drift in the TDOA measurements and compensate for them in location-finding results, statistical filters known as Kalman Filters are employed. A Kalman filter is an ideal Gaussian estimator in that the Kalman filter output coefficients, which are determined from sample statistics of the Kalman Filter input data, yield the best mean-square fit to a straight line. The coefficients (slope and offset) of the line are easily updated as new samples are gathered, via the Kalman filter algorithm.

However, in order to process TOA data from a number of location receivers and successfully use all of the TOA data obtained, a number of Kalman Filters equal to the number of pairs (permutations of subset size two) of location receivers must be calculated and continuously updated, incurring a significant computational burden within the system. The present invention provides an additional embodiment in that reduces the number of filters required for virtually synchronizing the location receivers by distributing the computation of synchronization information and associating groups of location receivers within the wireless network.

Figure 1:
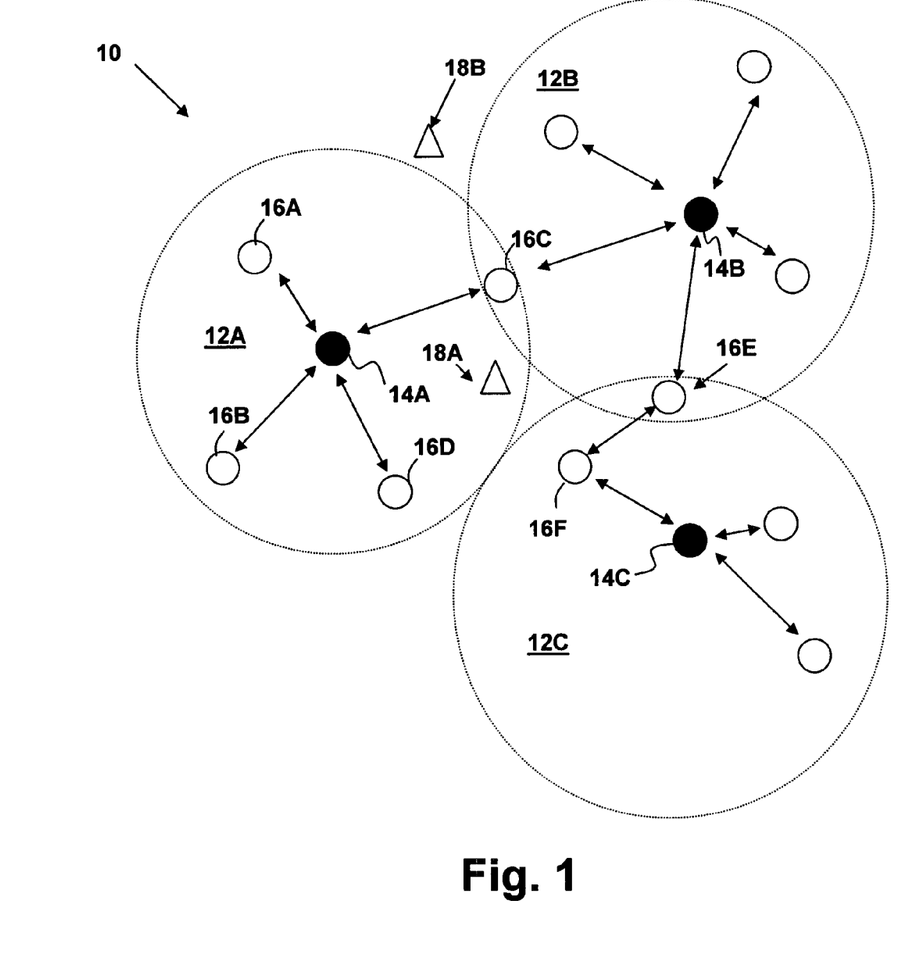
FIG. 1 is a pictorial diagram depicting a wireless network organized in accordance with an embodiment of the present invention.

Referring now to the figures and in particular to FIG. 1, a wireless network 10 within which the present invention is embodied is depicted in a pictorial diagram. Fixed-position location receivers within the wireless network are associated in groups 12A–C, although not necessarily all fixed-position location receivers within wireless network 10 will be assigned to any group. Groups 12A–C are used to reduce the complexity of the TOA measurement and drift/offset compensation for the system by referencing groups to each other via one or more selected receivers in each group. Location receivers 16,14 are associated together and selecting one location receiver as a primary location receiver 14 in each group. Location receivers 16A–D are associated with a primary location receiver 14A within group 12A. Instead of calculating and tracking TDOA differences between each location receiver 16 in wireless network 10, the present invention calculates only TDOA differences between primary location receivers 14A–C and the other location receivers 16A–F (as well as the other location receivers depicted in the drawing, but not indicated by reference designator). Thus, groups 12A–C reduce the number of Kalman filters required to track frequency drift and offset of the local clocks within location receivers 16,14.

Location receivers 16,14 in each group are listed in order of descending preference for use as the primary receiver. Ordering may be arbitrary, or based on a factor such as the physical locations of the location receivers relative to an access point. If the primary receiver does not report a beacon signal TOA, then the secondary receiver's reported beacon signal TOA can be used to estimate the interval between the last beacon signal and the present beacon signal. That difference is then added to the primary receiver's TOA for the previous beacon signal to determine the primary receiver TOA. If neither the primary nor secondary receive report a particular beacon signal, the algorithm proceeds down the list to the tertiary receiver, and so forth. The order of receivers in the list can be made adaptive and responsive to conditions such as failure to report several consecutive beacon signal TOAs, measured signal quality and so forth.

For multiple group location finding systems, in order to determine the relationship between groups, "mutual" location receivers 16C and 16E are associated as members of more than one group. A mutual receiver can be a member of more than one group, providing synchronization of all of the groups in which the mutual receiver is associated. All that is necessary to support synchronization of multiple groups 12 is that each group 12 has at least one location receiver (e.g., location receiver 16C) synchronized with another group. Since within group 12A, the clock drift and offset for each location receiver 16A–D is known with respect to primary location receiver 14A, the timebase relationship between 14A and location receiver 14B can be calculated and similarly the timebase relationship between location receiver 16E and primary location receiver 14B permits resolution of the timebase relationship between primary location receivers 14C and 14B, which permits calculation of timebase offset and drift for any combination of location receivers 14 and 16. The other requirement of a multi-group location finding system is that all of the groups be referenced to another group via a mutual location receiver so that no group is left without reference to the other groups in the wireless network.

In addition to the fixed-position location receivers associated in groups 12 above, wireless network may include mobile (or other stationary) wireless devices 18A and 18B. Location of wireless devices 18A and 18B can be very accurately determined due the synchronization (virtual or actual) of the location finding system. In general, the location finding ability of wireless network 10 permits detection of mobile or movable device as well as determination of whether or not any fixed device has moved or is being impersonated. In order to determine location according to the system and method of the present invention, devices used as location receivers in the sense that they incorporate the requisite electronics and are participating in the calculation of location of another device, must be in a fixed location and their actual position known, so that the theoretical TDOA relative to another location receiver (due to the propagation time differences) may be calculated and used to adjust the TDOA calculation that determines the location of other devices. Once the TDOA deviation of the locating receivers have been tracked and estimated, the model of drift (due to frequency offset and frequency drift) and bias (initial offset of the timebases) derived from the synchronization method outlined above can be applied to location determination TDOAs from other wireless devices, including signals received prior to and after a beacon signal.

Figure 2:
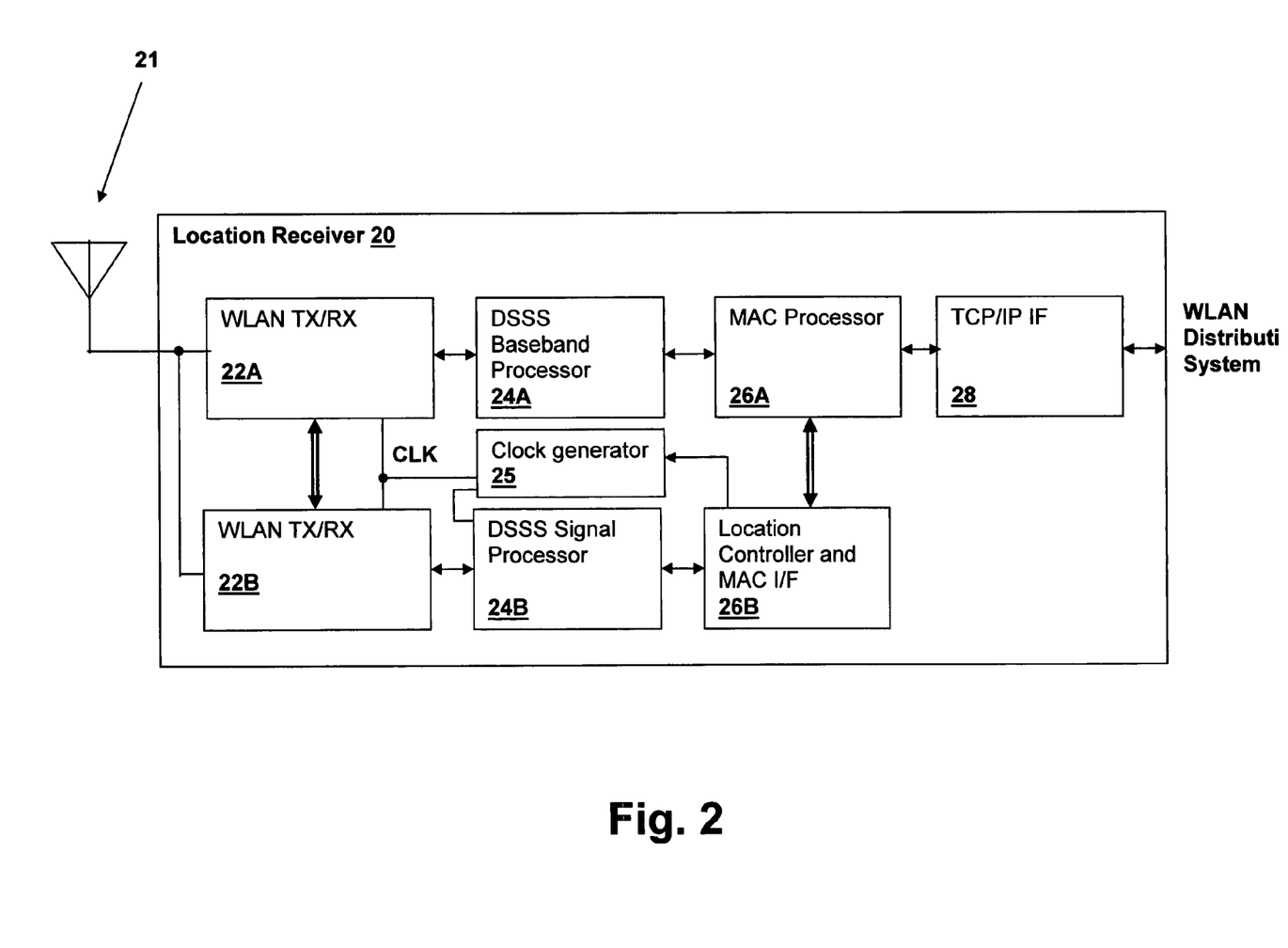
FIG. 2 is a block diagram of a location receiver in accordance with an embodiment of the present invention.

Referring now to FIG. 2, a location receiver 20 in accordance with an embodiment of the present invention is depicted in a block diagram. Location receiver 20 may be a dedicated location unit, or may be a wireless network device having enhanced features for location determination according to TOA measurements. A WLAN transmitter/receiver 22A is coupled to an antenna 21 for receiving wireless network signals, which will generally be direct-sequence spread-spectrum signals (DSSS). Antenna 21 may include multiple antennas coupled to WLAN transmitter/receiver 22A in order to provide spatial diversity. A DSSS baseband processor 24A detects and decodes the DSSS signals and passes the decoded information to a media access control (MAC) processor 26A that generates MAC (layer 3) network packets and passes them to a transmission control protocol/Internet protocol (TCP/IP) interface 28 for conversion to the TCP/IP (layer 4) packets for communication with the network-coupled device. In the return direction, TCP/IP packets received from the network-coupled device at TCP/IP interface 28 are converted to MAC packets by MAC processor 26A and are passed for encoding (DSSS modulation) to DSSS baseband processor 24A, which provides a signal input to the transmit portion of WLAN transmitter/receiver 22A. WLAN transmitter/receiver 22A transmits a wireless network signal to other network devices via antenna 21.

A TOA signal section is provided by a second WLAN transmitter/receiver 22B (or a single transmitter/receiver can be used for the location section and network section of the location unit as long as the TOA measurement requirements are fulfilled by the receiver design). WLAN transmitter/receiver 22B receives a signal from antenna 21 and sends it to a special DSSS processor 24B that determines the TOA of the received signal. The TOA information is passed to a location controller that includes a MAC interface 26B coupled to MAC processor 26A in the network section, so that the TOA information can be communicated to a master unit within the wireless network. Alternatively, the communications path from MAC interface 26B can be passed to a non-wireless Ethernet interface or other wired LAN interface for communicating the TOA information to the master unit.

A clock synthesizer 25 provides the local clock for transmission/reception frequency generation/selection, as well as Internal timing of DSSS signal processor 24B. In practice, clock synthesizer may include multiple clock circuits for clocking blocks internal to location receiver 20. Clock generator 25 is coupled to location controller 26B so that in an alternative embodiment of the present invention, clock generator 25 frequency can be adjusted in conformity with network messages received from a master unit that computes the frequency offset of a clock within clock synthesizer in conformity with the gathered TOA difference information described in general above.

However, in the main, the techniques of the present invention are used to compensate for received time of arrival values by calculation (virtual synchronization) rather than actually adjusting clock generator 25 frequencies. If a hardware frequency adjustment is employed, the adjustable frequency may be the local clock for the entire location receiver 20 (thus adjusting the transmission/reception synthesizer), or may be the frequency of a separate clock within clock generator 25 that clocks only the location-finding electronics of DSSS signal processor 24B. Adjustment of clock generator 25 is generally performed by programming divisor/multiplier values within a synthesizer forming clock generator 25, but may also be accomplished by tuning a resonant oscillator, such as in a varactor-tuned crystal oscillator (VTXO) with an associated D/A converter and control electronics as are well known in the art. Once the frequency offset and drift is compensated, only the timebase offset must be corrected (generally by resetting the timebase counter) or otherwise accounted for in the measurements. However, the above-described hardware adjustments are only necessary for physical synchronization. The virtual synchronization techniques of the present invention do not require hardware adjustment at all. The physical synchronization techniques may be used in combination with the virtual synchronization computation to reduce the range over which the virtual synchronization must correct for error in the location receiver timebases.

Figure 3:
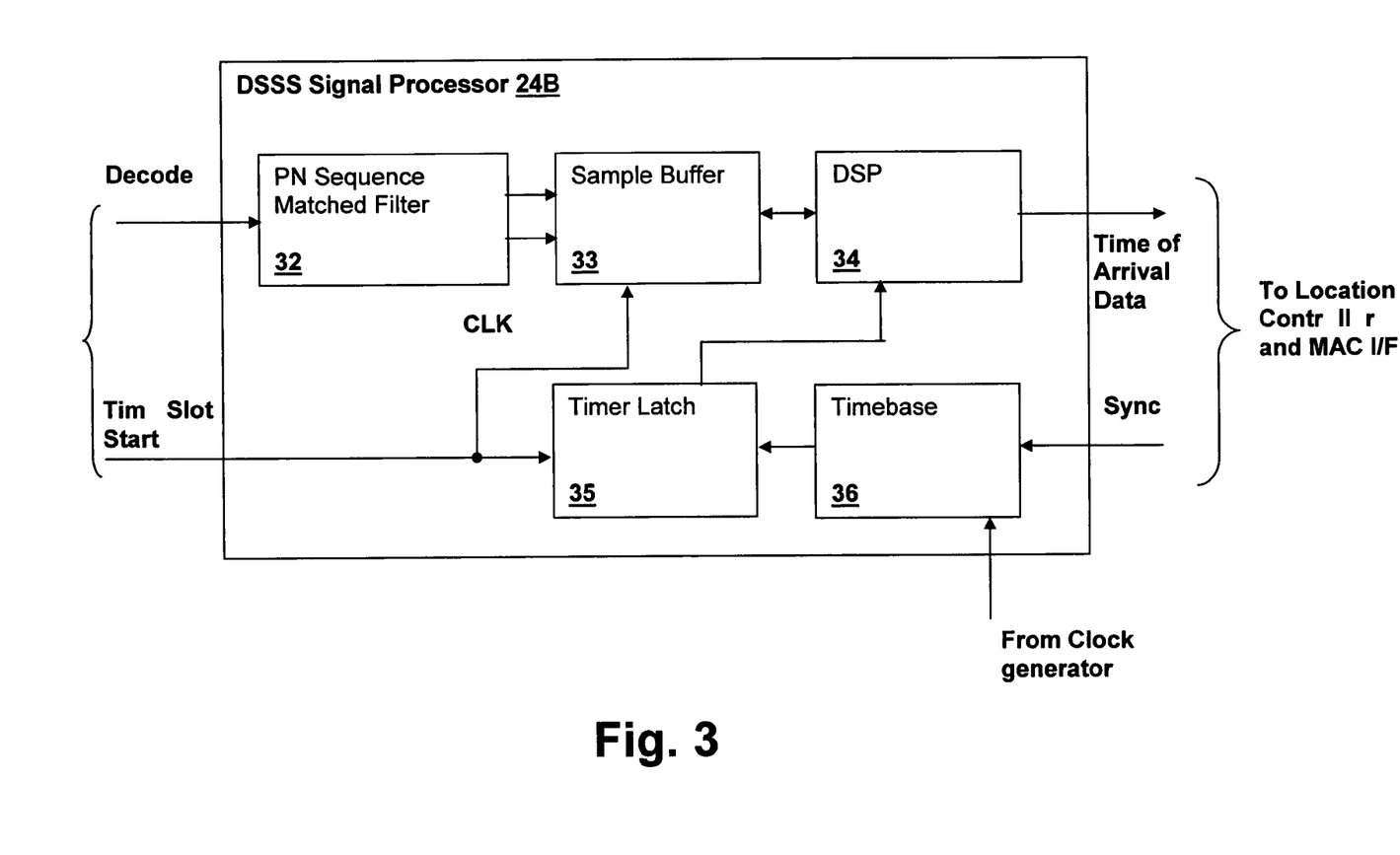
FIG. 3 is a block diagram showing further details of the location receiver of FIG. 2.

Referring now to FIG. 3, details of DSSS processor 24B are depicted in a block diagram. The decode input accepts signals from a receiver (WLAN transmitter/receiver 22B) and a PN sequence matched filter 32 correlates the location signal to provides a series of samples in (I,Q) pairs that are stored in a sample buffer 33. A Time Slot Start signal is provided by WLAN transmitter/receiver 22B and is used to start the sampling process via a timer latch 35. A timebase 36 provides the reference clock for sampling, and may be synchronized by the adjustment of the clock generator 25 as described above for "physical synchronization" providing the reference signal to timebase 36 in accordance with one embodiment of the invention, alternatively, timebase 36 may be periodically set by location controller 26 in response to messages received from a master unit via MAC processor 26A.

In general, timebase 36 does not need to be corrected at all, as computational adjustments to TOA measurements (generally performed in the master unit) correct for variations in clock generator 25 frequency and differences in timebase initial values (virtual synchronization). It should be noted that the precision of timebase 36 can be such that the TOA measurement precision is to a time interval shorter than the length of an individual sequence bit or "chip". In general, the device is capable of determining the arrival to a precision of 1/10 to 1/64 of the sample interval.

A digital signal processor (DSP) 34 computes the TOA of a received signal and transmits the TOA information to the master unit or server (the unit that performs the synchronization computations) over a wired or wireless network. Location controller and MAC interface 26B sends the TOA information to MAC processor 26A, which then formats the TOA message and TCP/IP interface 28 sends the TOA message through the wired or wireless network to the master unit. For group-organized systems, the TOA differences between the primary location receiver and each of the other members can be calculated (generally within the primary location receiver) and the TOA differences for that group communicated to the master unit and the master unit itself may be one of the location receivers, primary or otherwise. Additionally, the reference transmitter in the system may be an access point normally provided in the network, a dedicated beacon unit, one or more of the location receivers, or a device otherwise located in a predetermined position with respect to the location receivers. If location transceivers are used to implement the beacon used for synchronization, the transceiver transmitting the beacon message can be selected so as to reduce multipath error and the designated beacon sending unit can be rotated among the transceivers to further reduce multipath error, as all locations of the location receivers are known.

The beacon transmit interval may also be system programmable in order to achieve the desired location finding accuracy, or based on available bandwidth (more frequent beacon transmissions when the network load is low), et cetera. Multiple beacons and/or multiple antennas coupled to a single beacon and selected via a switch may be employed in order to improve synchronization and location determination accuracy by providing multiple transmit locations. The channel used to transmit beacon messages and beacon power levels can be dynamically adjusted to improve performance, minimize interference between beacons and avoid interference from other devices. The beacon transmit channel can also be adjusted based on measurements of channel quality as evaluated by the synchronization computations at the master unit, or by determination of other signal quality indicators provided from the location receivers or as detected at the master unit. Alternatively multiple beacons may rotate through a set of multiple transmission channels and the receivers may either selectively receive one or more of said multiple channels, or the receivers may frequency-hop to match a transmit channel of a particular beacon. The quality of synchronization may further be reported to users and/or administrators and may be logged for subsequent examination and analysis. The beacon transmit power may be changed in response to detecting synchronization quality below a threshold, the transmit interval increased (thus increasing the effective power) and the location receivers may further select or reject (or the master unit may filter the reports of) particular beacon transmissions in order to improve synchronization quality.

DSP 34 determines the TOA for the received signal by performing coherent or non-coherent detection. Coherent detection at the message level is preferred if information about the transmitted message and signal is available such as frequency deviation of the signal and content of the message. In either case, coherent detection is performed at the symbol level by matched filter 32, providing higher signal to noise ratio (SNR) for the TOA measurement.

Figure 4:
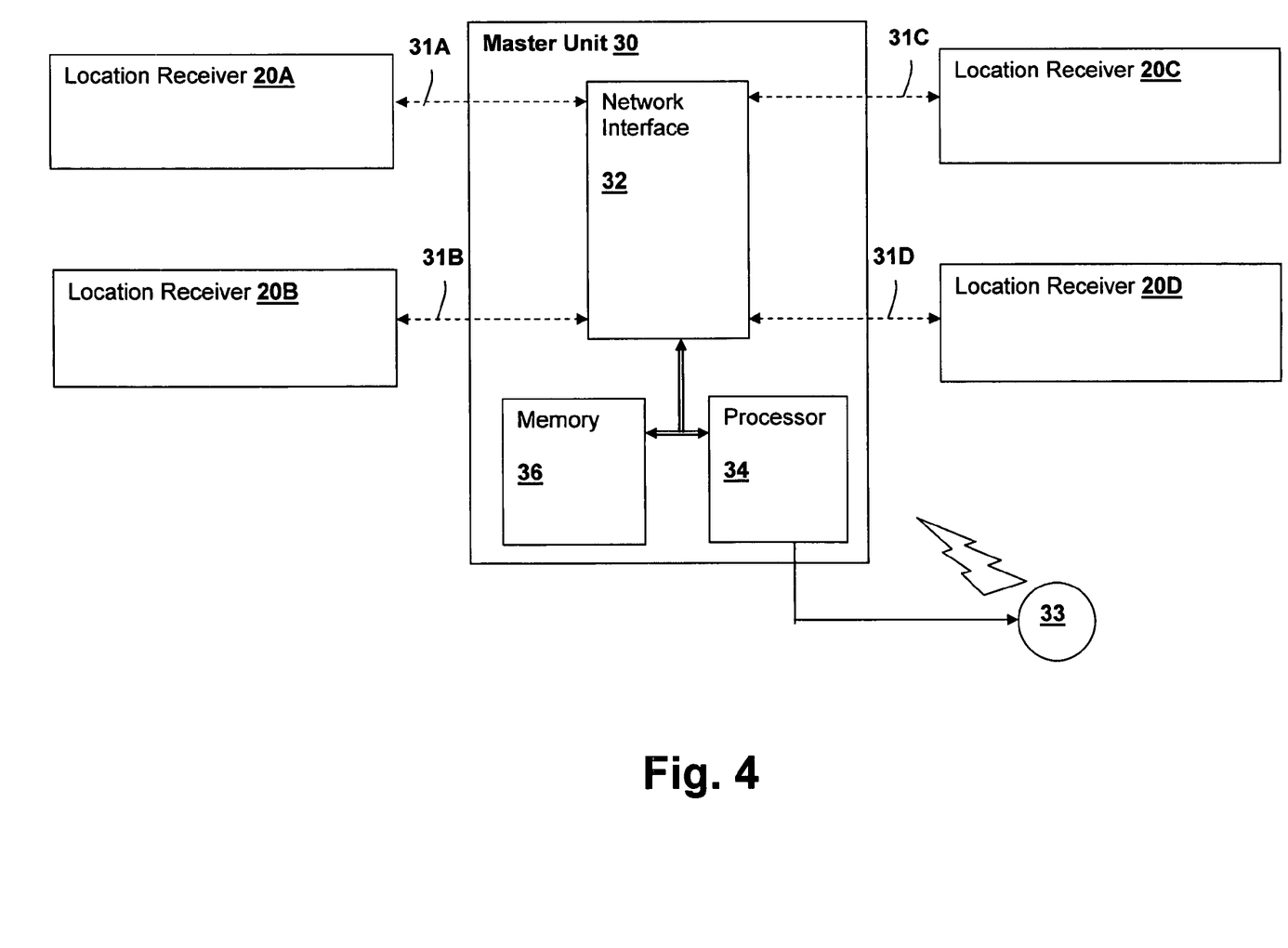
FIG. 4 is a block diagram of a wireless network in accordance with an embodiment of the present invention.

Referring now to FIG. 4, a location finding system in accordance with an embodiment of the present invention is depicted. A master unit 30 is coupled to multiple location receivers 20A–20D via wireless or wired network connections 31A–D. Within master unit 30 a network interface 32 provides communication with a processor 34 coupled to a memory 34 in which program instructions for execution by processor 34 are stored. Master unit 30 is generally a server that receives TOA information from location receivers 20A–20D via wireless or wired network connections 31A–D. A beacon unit 33 (which may comprise multiple beacons and which may be included within one or more of location units 20A–20D or master unit 30) provides a reference transmitter signal at periodic intervals. TOA measurements of the receiver reference transmitter signal are provided by location receivers 20A–20D to master unit 30, which computes the deviation between the TDOAs calculated from the reported TOAs and the theoretical TDOAs based on known positions of location receivers 20A–20D. The deviations over a number of received beacon signals (generally 10–200 in the current sample set) are collected in a statistical database and program that implements a smoothing filter (e.g., a Kalman filter) that acts on the computed deviations. The Kalman filters provide linear estimators for compensating for the bias and drift of each location receiver 20A–20D timebase over time. The estimators are used to correct the computed TDOAs for location-finding measurements (virtual synchronization), or alternatively, messages are sent messages from master unit 30 to location receivers 20A–20D that correct the local timebases and/or system clock in location receivers 20–20D as described above (physical synchronization) so that the accuracy of location-finding measurements are improved. A Kalman filter may be implemented for each pair of location receivers, or the network may be organized as in FIG. 1 and described in the associated description, so that only differences between individual location receiver timebases and a primary location receiver for the group to which a location receiver belongs, and timebase deviations between the primary location receivers in the network must be tracked.

Figure 5:
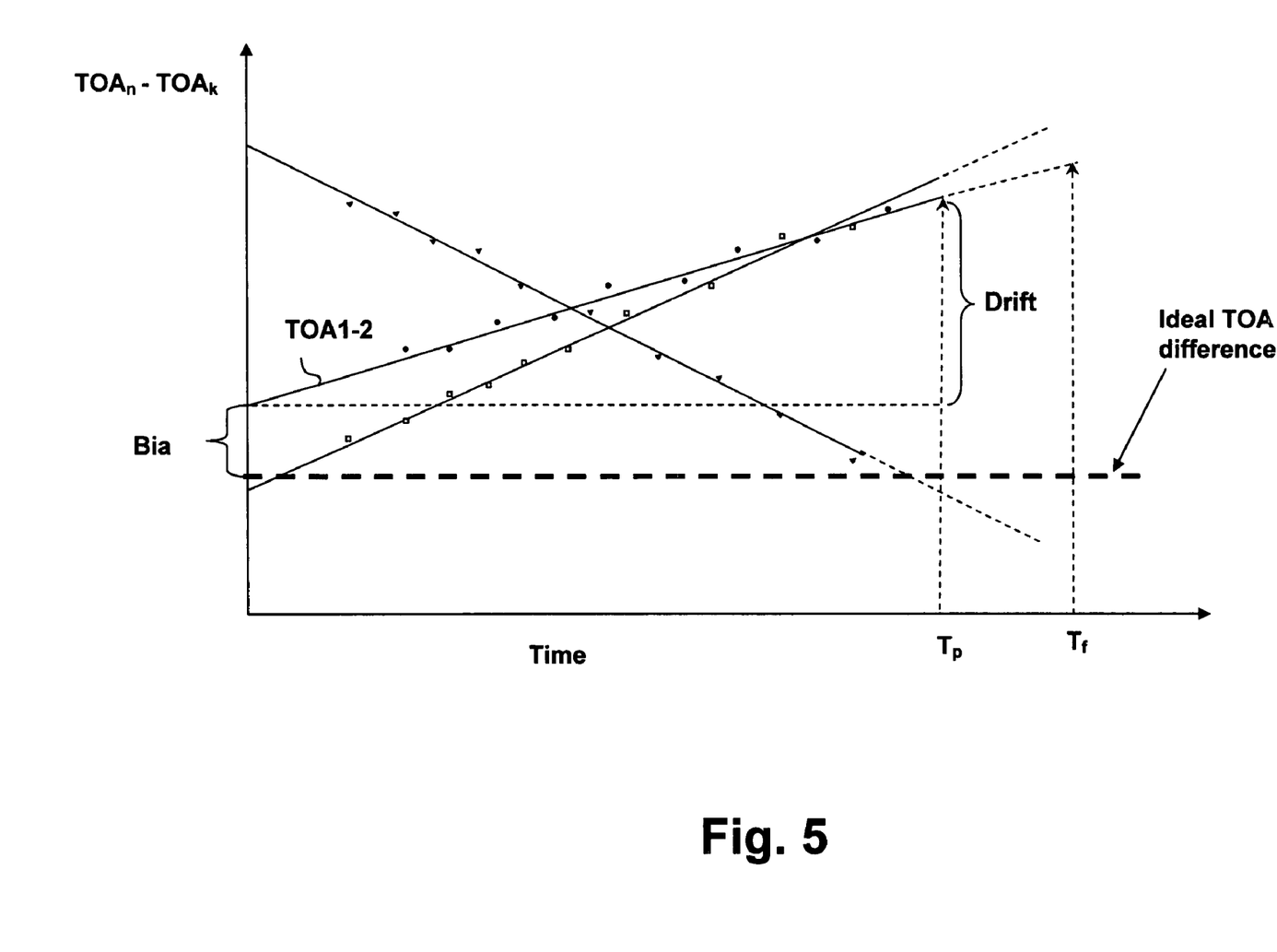
FIG. 5 is a graph depicting calculations within a method and system in accordance with an embodiment of the present invention.

Referring now to FIG. 5, a graphical illustration of the bias and drift estimation of the present invention is shown. Line TOA1-2 represents a best fit mean-square estimate for TOA differences (TDOA) between two location receivers for a series of transmitted signals. The zero time y-axis intercept point is an indication of a bias from the ideal TDOA minus the theoretical TDOA as measured by the time zero timebase offset for the current location receiver sample set. The slope of the line is a measure of the drift over time. Drift as indicated on the graph at present time $T_f$ provides a predictor of the value of the TOA error due to bias and drift at future time $T_f$ and can also be used to retroactively correct non-calibration TDOA measurements that have already been completed for other wireless devices or for non-beacon messages that have already been received by the location receivers. A measure of synchronization quality can also be made from the spread of the data and used to provide an indication of the accuracy of location finding measurements and adjust parameters such as beacon transmit power and/or channel as mentioned above. A log and/or console report of synchronization quality can be maintained for a user readable indication.

Figure 6:
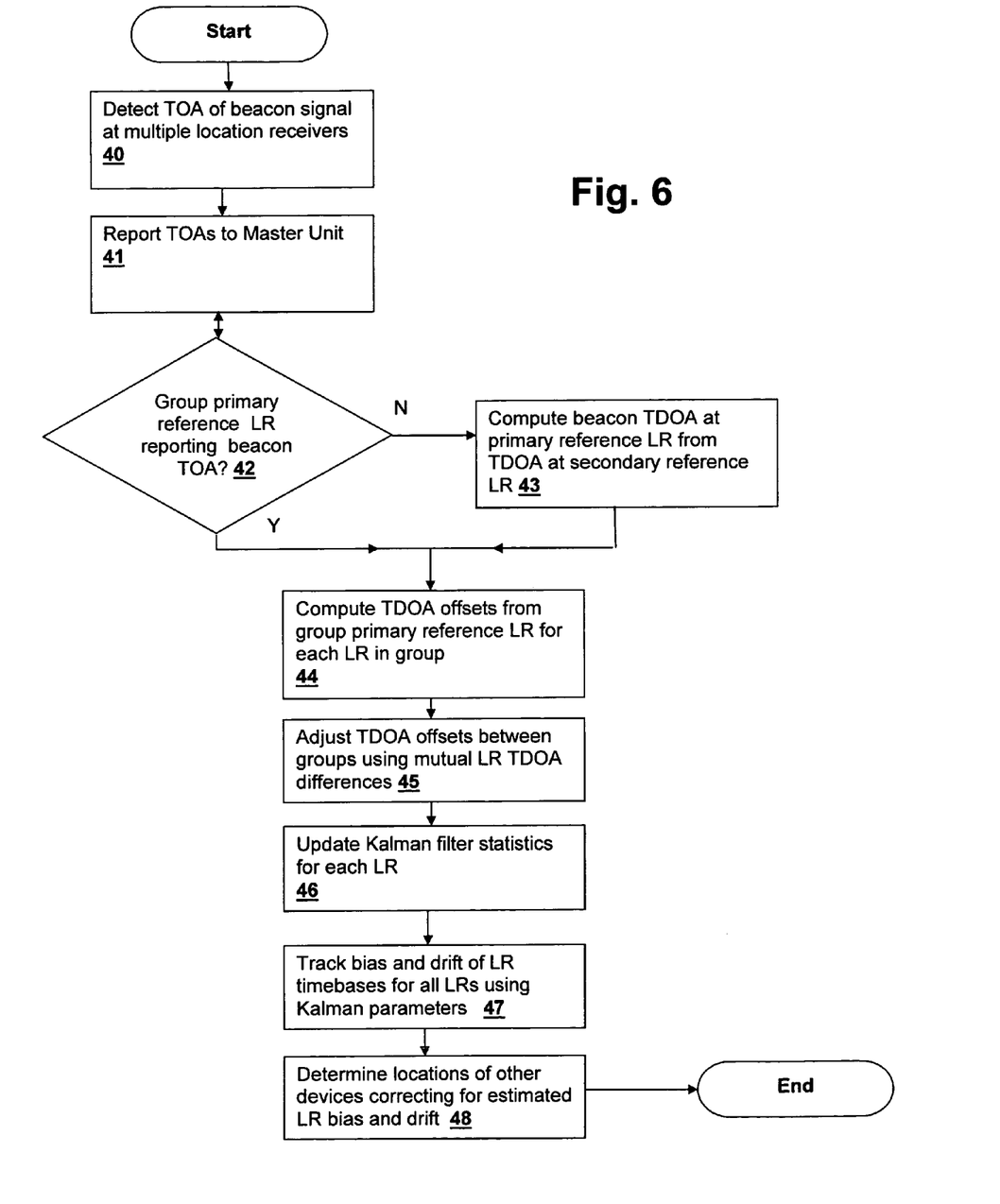
FIG. 6 is a flowchart depicting a method and operation of a system in accordance with an embodiment of the present invention.

Referring now to FIG. 6, a method in accordance with an embodiment of the invention is depicted. First, for each beacon signal received by the location receivers, the TOA of the signal at each location receiver is detected (step 40). Then, the TOAs are reported to the master unit (step 41). After the TOAs reported by the location receivers are collected by the master unit, if a group primary location receiver is not reporting the beacon TOA (decision 42), then a beacon TOA is computed for the physical location of the primary location receiver based on the TOA of the beacon signal received at a secondary location receiver (step 43) and the known positions of the primary and secondary location receivers. Once all of the primary location receiver TOAs have been received at the master unit along with all location receiver TOAs from reporting location receivers, then TDOA offsets from each group primary location receiver are computed for each other location receiver in the group (step 44). Then, the TDOA offsets are adjusted between the groups using the mutual location receiver pair TDOAs (step 45). After the TDOA offsets for all reporting location receivers have been computed, the statistical sets for each of the Kalman filters are updated (step 46) and the bias and offset of the location receiver timebases are estimated for each location receiver from the Kalman parameters (step 47). Finally the locations of other wireless devices can be determined using estimates of current bias and drift of the individual location receivers' timebases (step 48), including the location of the participating location receivers themselves subsequent (or prior in the case of retroactive correction) to the calibration interval. Alternatively in (step 48) the correction may be made by tuning the clocks/timebases of the individual location receivers via network messages as described above, which will provide correction of TDOAs computed from subsequently received TOAs.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method for synchronizing location finding measurements in a wireless network, comprising:
    receiving transmissions from at least one transmitter at multiple receivers, wherein said multiple receivers are located at predetermined locations with respect to said at least one transmitter;
    determining actual times-of-arrival of said received transmissions in response to said receiving;
    first computing differences between said actual times-of-arrival for said multiple receivers to determine actual time-differences-of-arrival for pairs of said multiple receivers;
    second computing differences between said actual time-differences-of-arrival and theoretical time-differences-of-arrival determined in conformity with said predetermined locations;
    estimating error in timebases of said multiple receivers in conformity with said second computed differences; and
    correcting measurements of other time-differences-of-arrival of other transmissions in conformity with said estimated error.

2. The method of claim 1, wherein said estimating estimates drift and offset of internal timebases of said multiple receivers.

3. The method of claim 1, wherein said correcting comprises adjusting a calculation of a location of a transmitting source that originated said other transmissions in conformity with said estimated error.

4. The method of claim 3, wherein said other transmissions occurred prior to said estimating, and wherein said correcting is performed on stored time-difference-of-arrival information.

5. The method of claim 1, wherein said estimating further comprises predicting values of said error as a function of time, and wherein said correcting is performed in conformity with a predicted error in said other time-differences-of-arrival.

6. The method of claim 1, wherein said correcting is performed by adjusting a timebase within said multiple receivers, whereby an error of said measurements of other time-differences-of-arrival is reduced.

7. The method of claim 1, wherein said correcting is performed by adjusting a system clock of said multiple receivers, whereby an error of said measurements of other time-differences-of-arrival is reduced.

8. The method of claim 1, wherein said multiple receivers are organized in groups, and wherein said second computing comprises:
    third computing time-of-differences-of-arrival between a primary reference member of each group and other members of said group; and
    referencing time-differences-of-arrival between a primary reference member of a first group and a primary reference member of a second group by determining time-differences-of-arrival between said primary reference member of said first group and said primary reference member of said second group and a mutual member of said first group and said second group.

9. The method of claim 1, further comprising:
    collecting a result of said computing as a statistical sample set; and
    determining statistics of said sample set in conformity with a statistical model, and wherein said estimating comprises predicting said error using a predictor associated with said statistical model.

10. The method of claim 9, wherein said statistical model is a Gaussian model, and wherein said predictor is a Kalman filter.

11. The method of claim 1, further comprising:
    collecting a result of said computing as a sample set; and
    smoothing said data using a smoothing filter, and wherein said estimating comprises predicting said error using a result of said smoothing.

12. The method of claim 1, further comprising evaluating a quality of a result of said estimating, whereby a quality of said synchronizing is determined.

13. The method of claim 1, further comprising adaptively selecting particular ones of said transmissions, in response to a result of said evaluating, for in said estimating, whereby a quality of said synchronizing is controlled and a processing workload is reduced.

14. The method of claim 13, further comprising logging a result of said evaluating in an error log at discrete intervals, whereby a user may examine indications of said quality of said synchronization over time.

15. The method of claim 13, further comprising adjusting an interval of said transmissions in response to a result of said evaluating, whereby said quality of said synchronization is controlled.

16. The method of claim 13, further comprising adjusting a power level of said transmissions in response to a result of said evaluating, whereby said quality of said synchronization is controlled.

17. The method of claim 13, further comprising adjusting a channel of said transmissions in response to a result of said evaluating, whereby said quality of said synchronization is controlled.

18. The method of claim 13, wherein said transmitting is performed by alternating said transmissions between multiple channels, and wherein said receiving receives said transmissions via multiple receivers, wherein each of said receivers selectively receives said transmissions on one or more of said multiple channels.

19. The method of claim 13, wherein said transmitting is performed by alternating said transmissions between multiple channels, and wherein said receiving receives said transmissions via multiple receivers, wherein each of said receivers receives signals on said multiple channels by alternating a reception channel of said receiving.

20. A wireless network comprising:
at least one transmitter for providing reference beacon transmissions;
multiple receivers, each including a timebase for detecting actual times-of-arrival of said periodic reference beacon transmissions, wherein said multiple receivers are located at predetermined locations with respect to said at least one transmitter; and
a processor coupled to a memory, said memory containing program instructions for execution by said processor, wherein said program instructions comprise program instructions for:
first computing differences between said actual times-of-arrival for said multiple receivers to determine actual time-differences-of-arrival for pairs of said multiple receivers;
second computing differences between said actual time-differences-of-arrival and theoretical time-differences-of-arrival determined in conformity with said predetermined locations;
estimating error in said timebases of said receivers in conformity with said second computed differences, and
correcting measurements of other time-differences-of-arrival of other transmissions in conformity with said estimated error.

21. The wireless network of claim 20, wherein said program instructions for estimating comprise program instructions for estimating drift and offset of said timebases of said multiple receivers.

22. The wireless network of claim 20, wherein said program instructions for correcting comprise program instructions for adjusting a calculation of a location of a transmitting source that originated said other transmissions in conformity with said estimated error.

23. The wireless network of claim 22, wherein said other transmissions occurred prior to said estimating, and wherein said program instructions for correcting operate on stored time-difference-of-arrival information.

24. The wireless network of claim 20, wherein said program instructions for estimating further comprise program instructions for predicting values of said error as a function of time, and wherein said program instructions for correcting correct said other time-differences-of-arrival in conformity with a predicted error in said other times of arrival.

25. The wireless network of claim 20, wherein said program instructions for correcting communicate an indication of said estimated error to each of said multiple receivers, and wherein said multiple receivers correct said internal timebases in response to receiving said indication, whereby an error of said measurements of other time-differences-of-arrival is reduced.

26. The wireless network of claim 20, wherein said program instructions for correcting communicate an indication of said estimated error to each of said multiple receivers, and wherein said multiple receivers correct a system clock of each of said multiple receivers in response to receiving said indication, whereby an error of said measurements of other time-differences-of-arrival is reduced.

27. The wireless network of claim 20, wherein said multiple receivers are organized in groups, and wherein said program instructions for second computing comprise program instructions for:
third computing time-difference-of-arrival between a primary reference member of each group and other members of said group; and
referencing time-differences-of-arrival between a primary reference member of a first group and a primary reference member of a second group by determining time-differences-of-arrival between said primary reference member of said first group and said primary reference member of said second group and a mutual member of said first group and said second group.

28. The wireless network of claim 20, wherein said program instructions further comprise program instructions for:
collecting a result of said computing as a statistical sample set; and
determining statistics of said sample set in conformity with a statistical model, and wherein said estimating comprises predicting said error using a predictor associated with said statistical model.

29. The wireless network of claim 28, wherein said statistical model is a Gaussian model, and wherein said predictor is a Kalman filter.

30. The wireless network of claim 20, wherein said program instructions further comprise program instructions for:
collecting a result of said computing as a sample set; and
smoothing said data using a smoothing filter, and wherein said estimating comprises predicting said error using a result of said smoothing.

31. The wireless network of claim 20, wherein said processor and said memory are located in a server coupled in a communications link to said multiple receivers, whereby said server estimates said error.

32. The wireless network of claim 31, wherein said server corrects said measurements via calculation of locations of other transmitters originating said other transmissions in conformity with said estimated error.

33. The wireless network of claim 31, wherein said server corrects said measurements by communicating control signals over said communications link to said multiple receivers, said control signals bearing indications of estimated error each associated with a target one of said multiple receivers, and wherein said multiple receivers correct said internal timebase in response to receiving said control signal.

34. The wireless network of claim 31, wherein said server corrects said measurements by communicating control signals over said communications link to said multiple receivers, said control signals bearing indications of estimated error each associated with a target one of said multiple receivers, and wherein each said multiple receivers correct an included internal clock in response to receiving said control signal.

35. A computer program product comprising signal-bearing media encoding program instructions for execution by a processor within a device coupled to a wireless network, wherein said wireless network includes multiple receivers each including a timebase for detecting actual times-of-arrival of periodic reference beacon transmissions originating from a transmitter, wherein said multiple receivers are located at predetermined locations with respect to said at least one transmitter, and wherein said program instructions comprise program instructions for:
  first computing differences between said actual times-of-arrival for said multiple receivers to determine actual time-differences of arrival for pairs of said multiple receivers;
  second computing differences between said actual time-differences-of-arrival and theoretical time-differences-of-arrival determined in conformity with said predetermined locations,
  estimating error in said timebases of said multiple receivers in conformity with said computed differences, and
  correcting measurements of other time-differences-of-arrival of other transmissions in conformity with said estimated error.

36. The computer program product of claim 35, wherein said program instructions for estimating comprise program instructions for estimating drift and offset of said timebases of said multiple receivers.

37. The computer program product of claim 35, wherein said program instructions for correcting comprise program instructions for adjusting a calculation of a location of a transmitting source that originated said other transmissions in conformity with said estimated error.

38. The computer program product of claim 35, wherein said multiple receivers are organized in groups, and wherein said program instructions for second computing comprise program instructions for:
  third computing time-difference-of-arrival between a primary reference member of each group and other members of said group; and
  referencing time-differences-of-arrival between a primary reference member of a first group and a primary reference member of a second group by determining time-differences-of-arrival between said primary reference member of said first group and said primary reference member of said second group and a mutual member of said first group and said second group.

39. The computer program product of claim 35, wherein said program instructions further comprise program instructions for:
  collecting a result of said computing as a statistical sample set; and
  determining statistics of said sample set in conformity with a statistical model, and wherein said estimating comprises predicting said error using a predictor associated with said statistical model.

40. The computer program product of claim 39, wherein said statistical model is a Gaussian model, and wherein said predictor is a Kalman filter.

41. The computer program product of claim 35, wherein said program instructions further comprise program instructions for:
  collecting a result of said computing as a sample set; and
  smoothing said data using a smoothing filter, and wherein said estimating comprises predicting said error using a result of said smoothing.

* * * * *